United States Patent
Semersky et al.

(10) Patent No.: US 8,380,203 B1
(45) Date of Patent: Feb. 19, 2013

(54) ENHANCED WLAN ASSOCIATION FOR ROAMING

(75) Inventors: Matthew L. Semersky, Santa Clara, CA (US); Frank Huang, Pleasanton, CA (US); James Jan, San Jose, CA (US); Robert Lee, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 1253 days.

(21) Appl. No.: 11/937,854

(22) Filed: Nov. 9, 2007

Related U.S. Application Data (60) Provisional application No. 60/865,329, filed on Nov. 10, 2006.

(51) Int. Cl.
*H04W 36/00* (2009.01)

(52) U.S. Cl. ............ 455/437; 455/436; 455/432.1; 455/343.2; 455/343.1; 370/332; 370/311

(58) Field of Classification Search .......... 455/436–444, 455/334, 343.1–343.5, 574, 432.1–434; 370/310, 370/311, 321–334
See application file for complete search history.

(56) References Cited

U.S. PATENT DOCUMENTS

| | | | |
|---|---|---|---|
| 6,839,329 B1 * | 1/2005 | Sato et al. | 370/310.1 |
| 7,904,086 B2 * | 3/2011 | Kundu et al. | 455/436 |
| 2005/0192011 A1 * | 9/2005 | Hong et al. | 455/440 |
| 2006/0281436 A1 * | 12/2006 | Kim et al. | 455/343.2 |
| 2007/0014259 A1 * | 1/2007 | Fajardo et al. | 370/331 |

OTHER PUBLICATIONS

Ramani et al., "SyncScan: Practical Fast Handoff for 802.11 Infrastructure Networks," University of California.

* cited by examiner

*Primary Examiner* — Ajit Patel
*Assistant Examiner* — Ronald Eisner (57) ABSTRACT

A communication device using a current wireless network via a first access point confirms availability of a second access point before breaking the current connection. To confirm availability of the second access point, the communication device sends a power management message that causes the first access point to store packets during the power management period. After the connection to the second access point is confirmed, the second session may be put on hold using the same technique while the connection to the first access point is restored, the stored packets processed and the connection closed. Then the connection to the second access point may be reactivated and further communication made through the second access point.

19 Claims, 7 Drawing Sheets

ENHANCED WLAN ASSOCIATION FOR ROAMING

CROSS-REFERENCE TO RELATED APPLICATION

The present application claims the benefit of U.S. Provisional Application No. 60/865,329, entitled "ENHANCED WLAN ASSOCIATION FOR ROAMING," filed on Nov. 10, 2006, which is hereby incorporated by reference herein.

DESCRIPTION OF RELATED ART

Wireless Local Area Network (WLAN) technology, for example, an IEEE 802.11 protocol, uses a communication device with a wireless modem to communicate data with an access point on another wireless or fixed network, usually connected to a corporate infrastructure or the Internet. The wireless modem may be associated with a device, such as a PC card in a laptop, or may be integral to a unit, such as a cordless telephone handset. The data transmitted may be Internet Protocol (IP) data used to support a variety of applications from Voice over Internet Protocol (VoIP) to browsing application data. A variety of WLAN protocols exist, including, but not limited to, 802.11(a), 802.11(b), 802.11(d), and 802.11(g), with the promise of more on the horizon. In some applications, the communication device may be stationary, for example, a desktop computer may use a WLAN to simplify network wiring. However, in other applications, the ability of the communication device to roam in a coverage area may be key to the success of the communication device's application, such as a mobile telephone.

A mobile communication device may roam within the coverage area of a single access point. However, when roaming over a larger area, it may not be possible to remain within coverage of a single access point. When that is the case, the current data session with the current access point must transition to a new access point. Proposed standards will allow roaming by adding intelligence to access points to allow out-of-band communication to arrange transfer of the data session from one access point to another. However, millions of access points are already in place that do not support such proposed standards. Roaming in these environments risks loss of connection because a current connection is dropped before a new connection can be established.

Figure 1:
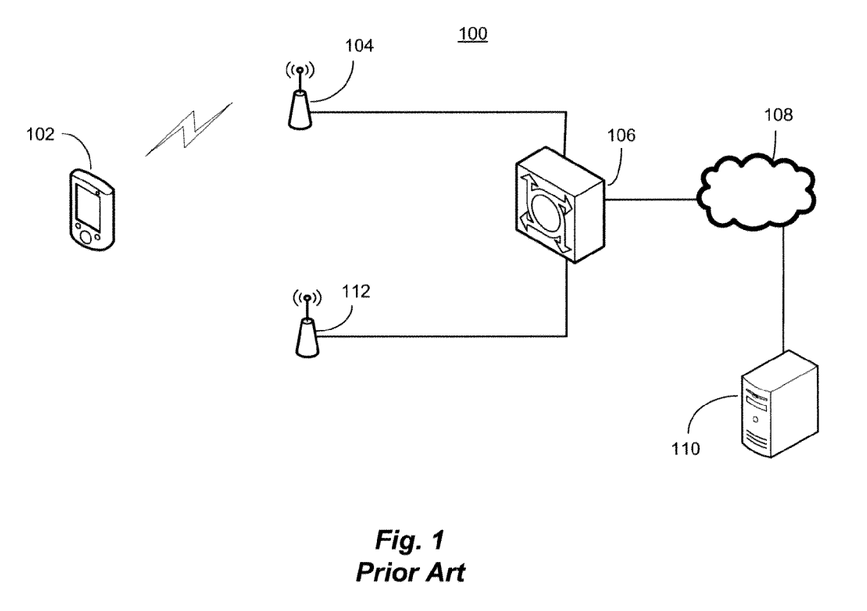
FIG. 1 is a block diagram of a prior art implementation of a wireless local area network.

FIG. 1 illustrates a prior art WLAN environment 100 with a communication device 102 communicating wirelessly with an access point 104. The access point 104 communicates in some environments with a communications controller 106. The communications controller 106 may allow further communications with a server 110 via a network 108. The server 110 may be an enterprise server on an Intranet or may be a web server or other host on a public wide area network such as the Internet. When the communication device 102 moves beyond the coverage area of the access point 104, the communication device 102 may break the connection with the access point 104 and then attempt to connect with a second access point 112. If the connection with the second access point 112 fails, the communication device 102 may attempt to reconnect to the access point 104.

Even if the communication device 102 can reconnect to the access point 104, an interruption in service is likely to result. Such an interruption in service may only be a nuisance in some applications. But when real-time traffic is involved, such as a Voice over Internet Protocol (VOIP) phone call, the interruption may be much more than a nuisance, representing a significant interruption in service.

SUMMARY OF THE DISCLOSURE

A communication device that roams between access points in a WLAN network takes advantage of an available function to implement a roaming handoff that is backwards compatible with existing access point technology.

The 802.11 PSM (power save mode) defines a procedure for implementing power management during inactive periods. In particular, a sleep mode for saving power during inactive periods may be invoked by a communication device by sending an uplink frame with a power save (PS), or power management (PM) bit set to 'sleep.' This sleep command is supported by both communication devices and WLAN access points that follow the 802.11 PSM standard. When the sleep command is received at the access point, the access point will suspend its session and hold data destined for the communication device. The communication device takes advantage of the sleep command to, in turn, suspend sessions with both the old and new access points so that the communication device can confirm availability of a new connection before abandoning its existing connection. By first suspending the connection with a current access point, the communication device is able to establish a connection with a second access point before relinquishing the first connection. After the second connection is confirmed, the communication device can suspend the second connection, also using the sleep command, so that the communication device can return to the first connection long enough to exchange any packets stored during the time when the session was suspended with the sleep command.

After any stored packets have been communicated between the device and the first access point, the communication device can close the session with the first access point and restore the connection to the second access point. Because the second connection was confirmed and then suspended using the sleep command, the second connection merely needs to be re-activated using a wakeup command by sending an uplink packet with the power management bit set to 'active.'

DETAILED DESCRIPTION

Figure 2:
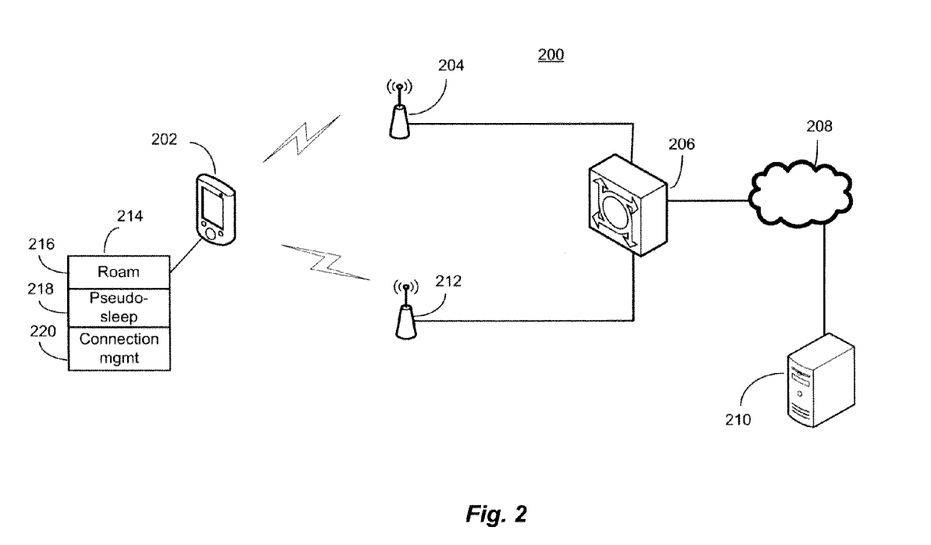
FIG. 2 is a block diagram of an implementation of a wireless local area network adapted for enhanced WLAN association for roaming.

FIG. 2 is a block diagram of an implementation of a wireless local area network (WLAN) 200 adapted for enhanced WLAN roaming A communication device 202 may be used in the WLAN 200. The communication device 202 may be, for example, a personal digital assistant (PDA), a mobile telephone, a smart phone, a multi-mode cellular phone, a laptop computer, a media player, etc. Two access points 204, 212 are illustrated in FIG. 2, although in some implementations, many more access points may be included. The two access points 204, 212 are also shown coupled to a common network communication controller 206. In other embodiments, the access points used for roaming in the manner described may be coupled to different communication controllers, or even different networks. In some implementations, the communication controller 206 may be omitted.

The communication device 202 may be associated with the access point 204 to support data traffic with a server 210, in this example via the communication controller 206. In a home environment, the communication controller 206 may be a router or modem, for example. In an enterprise environment, the communication controller 206 may be a concentrator, proxy server, or other network support device, for example.

In the embodiment illustrated in FIG. 2, the access point 204 is coupled to the server 210 via a network 208. The network 208 may be a local area network (LAN), a wide area network (WAN), the Internet, an enterprise network, etc. The server 210 may be a data server or may be switch, such as a VoIP switch.

The access point 212 may also be used for communication with the server 210. In most WLAN protocols, simultaneous sessions with more than one access point 204, 212 may be supported by either the communication controller 206 or the communication device protocol stack.

However, the communication device 202 may include additional capability for enhanced roaming, embodied in hardware, firmware, or software. Although a software implementation is described below, the conversion between software and hardware or firmware is well understood by those of ordinary skill in the art. Software 214 may include a roam management module 216, a pseudo power-save module 218, and a connection management module 220.

The roam management module 216 may monitor access points for more desirable connections. The roam management monitor 216 may support two functions, a connection monitor that determines when the signal from the current wireless access point is degrading toward an unacceptable level. An access point search manager may support searching for another wireless access point that can provide a connection with a better signal quality. The pseudo power-save module 218 may be activated to put a connection on hold, even though the communication device 202 will not go into a power-save mode. The connection management module 220 may manage the process of making a new connection before terminating an existing connection.

In operation, when the communication device 202 senses a degradation in signal quality with an access point by, for example, measuring signal-to-noise ratio, the communication device 202 may determine if another access point, such as the access point 212, is accessible, and whether the signal quality is better using the other access point. Each detectable access point may be monitored. In some embodiments, the availability and determination of signal quality may be part of this process.

In other embodiments, the determination of signal quality may be made separately from the process described here, for example, the roam module 216 may include a connection monitor means such as a module, hardware, etc. that measures signal quality independent of the roaming process. The roaming module may also include an access point search means may scan all available wireless connections for a wireless access point with a higher quality signal than the current signal. This may be in response to a trigger from the connection monitor means when the signal quality of the current connection begins to degrade or may be active at all times. The signal quality may be determined using signal strength, signal-to-noise ratio, or a combination.

When the roam management module 216 may determine that another access point is available and that it has better connection characteristics. If so, the pseudo power-save mode module 218 may be activated to send a packet to the current access point 204 with the power management bit set. This will cause the access point 204, or the communication controller 206 to hold the connection and store any packets bound for the communication device 202 rather than transmit them to the device 202.

During the time the first access point 204 believes the communication device 202 is sleeping for power saving purposes, the communication device 202 may be connecting to the second access point 212 under the direction of a connection manager means such as the connection management module 220. When the connection to the second access point 212 is confirmed and suitable operating characteristics are verified, the connection with the second access point 212 may similarly be put on hold by sending a packet to the access point 212 with the power-save bit set to 'on.'

The communication device 202 may reactivate the connection with the current (first) access point 204 by sending it a packet with the power-save bit set to off. The communication device 202 and access point 204 may then recover the transmission of any packets stored while the connection was suspended. To support real-time applications, the duration of the suspension should be relatively short, for example, tens of milliseconds, although this is merely a suggestion that is not intended to limit the scope of the invention in any way. Different implementations may tolerate suspension durations of different lengths.

After any stored packets on either end are exchanged, the communication device 202 may terminate the session with the first access point 204. The communication device 202 may then re-activate the connection with the second access point 212 and begin transfer of packets. In this example, the roaming transfer process is completed without the access points 204, 212 having knowledge of the roaming activity. Moreover, the roaming process did not require any modifications to the hardware or software of the access points because the power save command is supported by all devices compliant with the 802.11 PSM standard. Only the communication device 202 itself is aware that roaming functions rather than power management functions are taking place.

Figure 3:
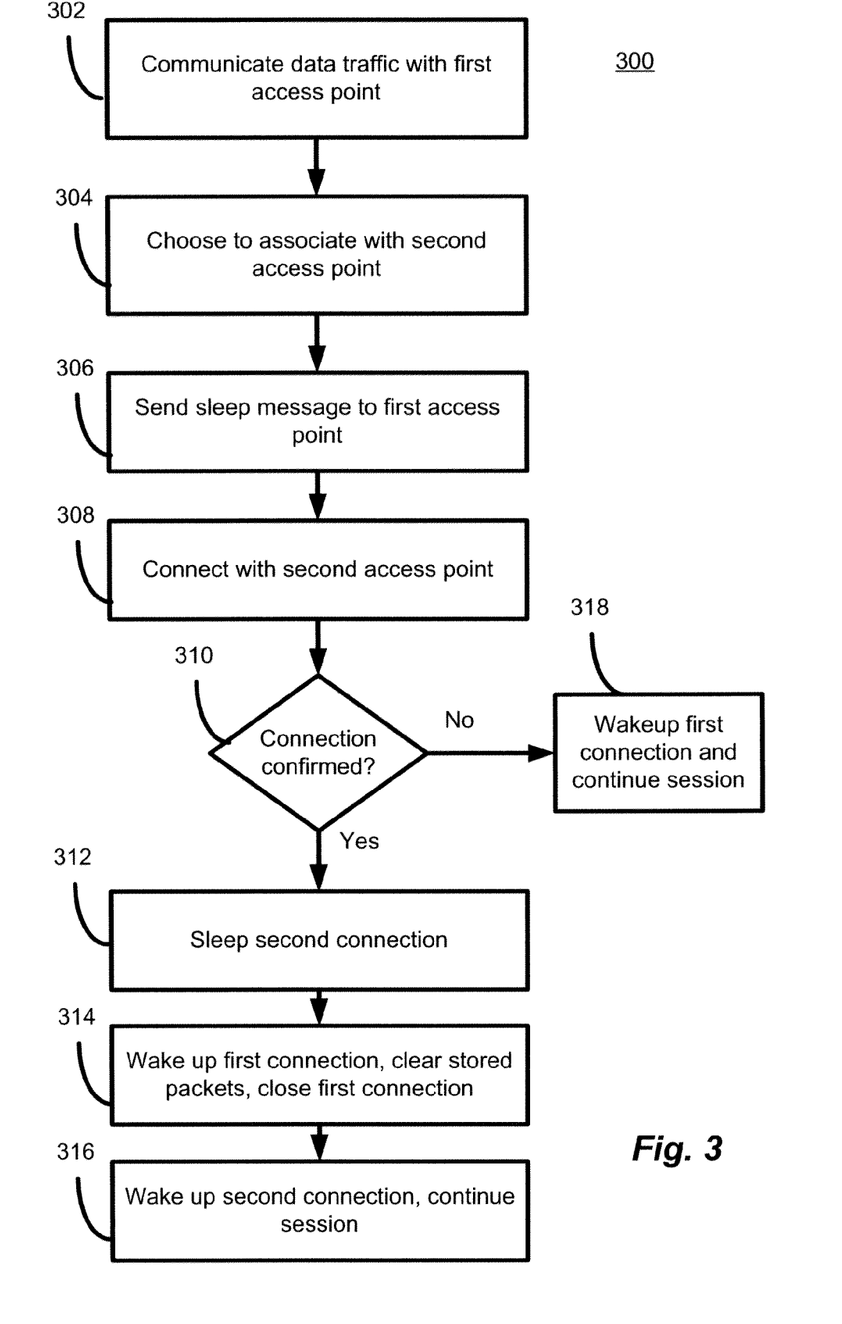
FIG. 3 is a method of implementing enhanced WLAN association for roaming.

FIG. 3 is a flow diagram of a method 300 of using power saving mode in a WLAN network with multiple access points to facilitate roaming. The method 300 may be implemented in a WLAN environment such as the WLAN of FIG. 2 or some other environment. The method 300 will be described with reference to FIG. 2 for ease of explanation. At block 302, a communication device such as the device 202 may be operating conventionally, transmitting and receiving data with an access point 204. The data traffic may be communicated via a custom or proprietary over the air protocol, the Internet Protocol (IP), etc.

At block 304, the communication device 202 may monitor for additional wireless access points and may choose to associate with the second access point 212. Choosing to associate with the second access point 212 may include determining that the signal quality from the second access point 212 is higher than a signal quality from the first access point 204. In another embodiment, this step may be deferred until later in the process, such as at block 308.

At block 306, the communication device 202 may send the first access point 204 a signal to suspend operation. In one embodiment using an IEEE 802.11 PSM protocol, the signal to suspend operation may be implemented using a packet with the power-save bit set, which is typically used to notify an access point that the communication device 202 is entering a power saving mode. When the access point 204 notes the communication device 202 is in a power saving mode, the access point 204 may begin storing pending outgoing packet data (i.e., data destined for the device 202). Depending on the network architecture, the outgoing packet data may be stored at the access point 204 or may be stored at the communication controller 206.

Similarly, packets generated at the communication device 202 destined for the access point 204 may be stored until the access point 204 is again expecting data traffic from the communication device 202.

At block 308, the communication device 202 may determine if a session with a second access point 212 is available. In one embodiment, determining if a session is available with the second access point 212 may include sending a signal to the second access point 212 for initiation the session while operation with the first access point is suspended.

In an embodiment where the communication device 202 is capable of only receiving one signal at a time, the communication device 202 may search for a signal from an alternate access point. At block 308, when such a signal is found, or was found previously at block 304, a connection may be made with the second access point 212.

At block 310, the connection with the second access point 212 may be confirmed, for example, a verification of signal-to-noise ratio associated with a connection between communication device 202 and access point 212 may be made. If at block 310, the connection to the second access point 212 cannot be confirmed or the signal-to-noise ratio is worse than that of the connection with the first access point 204, the no branch from block 310 may be taken to block 318. At block 318, the connection with the second access point 212 may be abandoned, the connection with the first access point 204 may be reactivated, or woken up, and the data session continued using the first access point 204.

If, at block 310, the connection with the second access point is confirmed, the yes branch from block 310 may be taken to block 312. At block 312, the connection with the second access point 212 may be suspended temporarily, by setting the power management bit in a packet and sending the packet to the second access point 212.

At block 314, a packet may be sent from the communication device 202 to the first access point 204 with the power management bit cleared, signaling to the first access point 204 that the communication device 202 is again available for data communication. Packets stored at the communication device 202, as well as packets stored on the fixed network side, e.g. at the access point 204 may be delivered. When any packet backlog is cleared, the communication device 202 may close the connection with the first access point 204, terminating that session.

At block 316, the communication device 202 may reestablish contact with the second access point 212 and wake up the connection by sending a packet to the access point 212 with the power management bit cleared. At this point, the communication device 202 has successfully roamed from the first access point 204 to the second access point 212.

FIGS. 4A-4F, illustrate various devices in which roaming between access points may occur, such as described above.

Figure 4A:
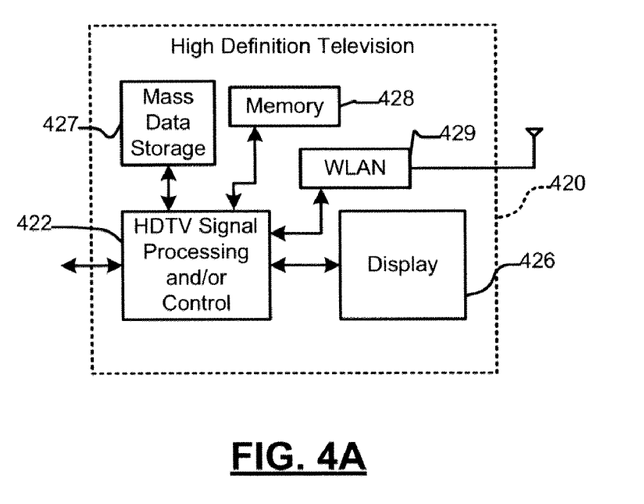
FIGS. 4A-4F illustrate exemplary embodiments incorporating enhanced WLAN association for roaming.

Referring now to FIG. 4A, such techniques may be utilized in a high definition television (HDTV) 420, particularly a mobile HDTV used portably in a home, resort, sports venue, etc. HDTV 420 includes a mass data storage 427, an HDTV signal processing and control block 422, a WLAN interface 429 and memory 428. HDTV 420 receives HDTV input signals in either a wired or wireless format and generates HDTV output signals for a display 426. In some implementations, signal processing circuit and/or control circuit 422 and/or other circuits (not shown) of HDTV 420 may process data, perform coding and/or encryption, perform calculations, format data and/or perform any other type of HDTV processing that may be required.

The WLAN interface 429 may implement roaming between access points, for example. HDTV 420 may be connected to memory 428 such as RAM, ROM, low latency nonvolatile memory such as flash memory and/or other suitable electronic data storage.

Figure 4B:
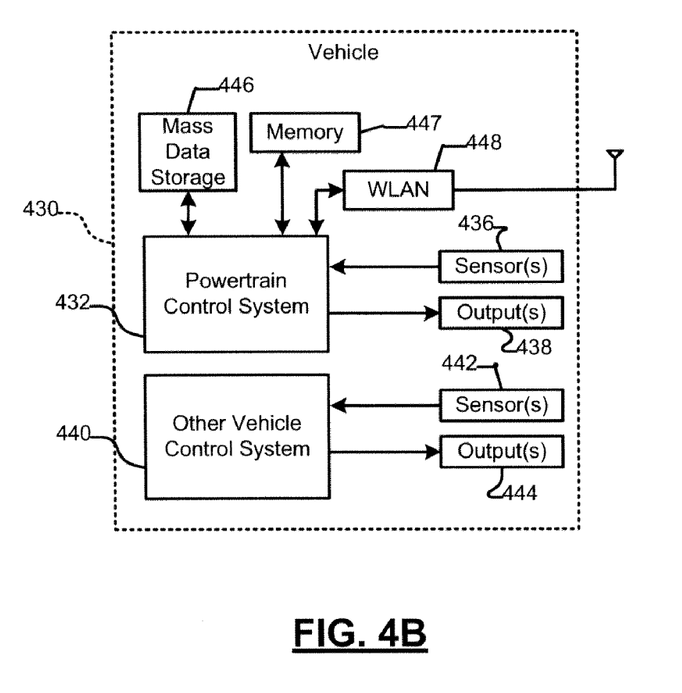

Referring now to FIG. 4B, such techniques may be utilized in a vehicle 430. The vehicle 430 includes a control system that may include mass data storage 446, as well as a WLAN interface 448. The mass data storage 446 may support a powertrain control system 432 that receives inputs from one or more sensors 436 such as temperature sensors, pressure sensors, rotational sensors, airflow sensors and/or any other suitable sensors and/or that generates one or more output control signals 438 such as engine operating parameters, transmission operating parameters, and/or other control signals.

Control system 440 may likewise receive signals from input sensors 442 and/or output control signals to one or more output devices 444. In some implementations, control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 432 may communicate with mass data storage 427 that stores data in a nonvolatile manner such as optical and/or magnetic storage devices. The mass storage device 446 may be a mini HDD that includes one or more platters having a diameter that is smaller than approximately 1.8". Powertrain control system 432 may be connected to memory 447 such as RAM, ROM, low latency nonvolatile memory such as flash memory and/or other suitable electronic data storage. Powertrain control system 432 also may support connections with a WLAN (not depicted) via a WLAN network interface 448. WLAN roaming, as described above, may be used when the vehicle is in motion and within access of one or more network access points (not depicted). For example, some municipalities are implementing city-wide WLAN networks that may support real-time functions, such as traffic reporting and control. Non-realtime functions may also be supported, such as diagnostics reporting. The control system 440 may also include mass data storage, memory and/or a WLAN interface (all not shown).

Figure 4C:
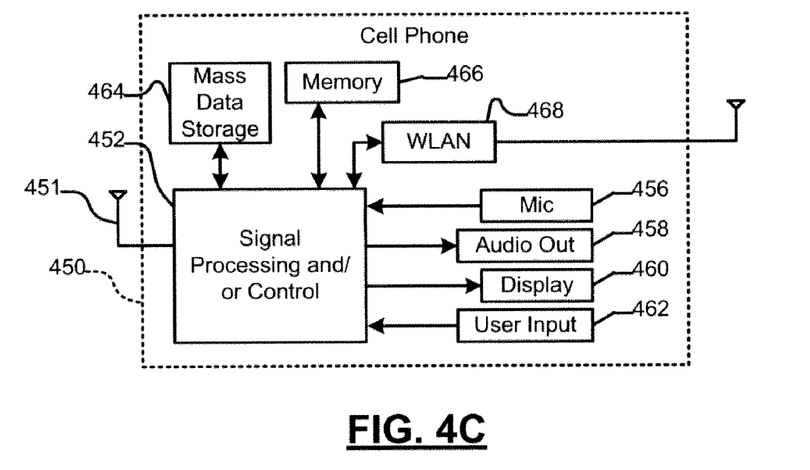

Referring now to FIG. 4C, such techniques may be used in a cellular phone 450 that may include a cellular antenna 451. The cellular phone 450 may include either or both signal processing and/or control circuits, which are generally identified in FIG. 4C at 452, a WLAN interface 468 and/or mass data storage 464 of the cellular phone 450. In some implementations, cellular phone 450 includes a microphone 456, an audio output 458 such as a speaker and/or audio output jack, a display 460 and/or an input device 462 such as a keypad, pointing device, voice actuation and/or other input device. Signal processing and/or control circuits 452 and/or other circuits (not shown) in cellular phone 450 may process data, perform coding and/or encryption, perform calculations, format data and/or perform other cellular phone functions.

Cellular phone 450 may communicate with mass data storage 464 that stores data in a nonvolatile manner such as optical and/or magnetic storage devices for example hard disk drives HDD and/or DVDs. The HDD may be a mini HDD that includes one or more platters having a diameter that is smaller than approximately 1.8". Cellular phone 450 may be connected to memory 466 such as RAM, ROM, low latency nonvolatile memory such as flash memory and/or other suitable electronic data storage. Cellular phone 450 also may support data connections via a WLAN network interface 468. The WLAN network interface 468 may be preferred when available for carrying voice or data traffic as being a lower cost system than a wide-area cellular network. When supporting voice connections over a WLAN connection, the roaming technique described above is particularly applicable.

Figure 4D:
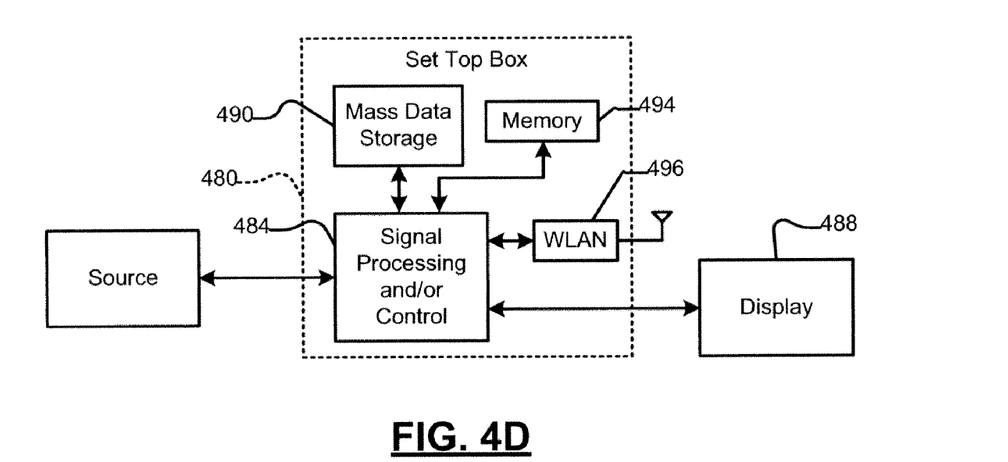

Referring now to FIG. 4D, such techniques may be utilized in a set top box 480. The set top box 480 may include either or both signal processing and/or control circuits, which are generally identified in FIG. 4D at 484, a WLAN interface 496 and/or mass data storage 490 of the set top box 480. Set top box 480 receives signals from a source such as a broadband source and outputs standard and/or high definition audio/video signals suitable for a display 488 such as a television and/or monitor and/or other video and/or audio output devices. Signal processing and/or control circuits 484 and/or other circuits (not shown) of the set top box 480 may process data, perform coding and/or encryption, perform calculations, format data and/or perform any other set top box function.

Set top box 480 may communicate with mass data storage 490 that stores data in a nonvolatile manner. Mass data storage 490 may include optical and/or magnetic storage devices for example hard disk drives HDD and/or DVDs. At least one HDD and/or DVD may include the circuitry of FIG. 1. The HDD may be a mini HDD that includes one or more platters having a diameter that is smaller than approximately 1.8". Set top box 480 may be connected to memory 494 such as RAM, ROM, low latency nonvolatile memory such as flash memory and/or other suitable electronic data storage. Set top box 480 also may support connections with a WLAN via a WLAN network interface 496. The set-top box 480, or a similar device, may be used portably, for example, in a vehicle, at a sporting venue such as a golf tournament or the Olympics to support personal video, etc. When roaming between WLAN access points the roaming techniques described above may be advantageously applied.

Figure 4E:
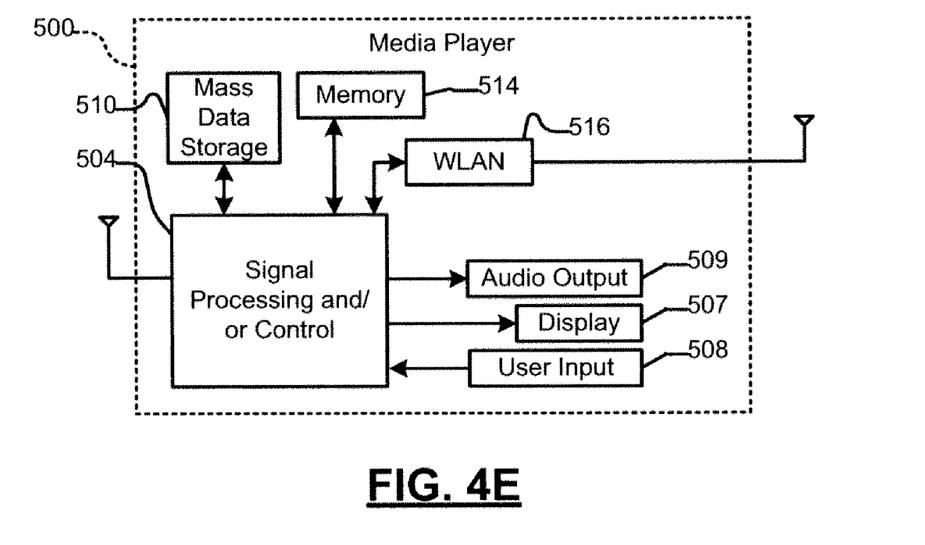

Referring now to FIG. 4E, such techniques may be used in a media player 500. The media player 500 may include either or both signal processing and/or control circuits, which are generally identified in FIG. 4E at 504, a WLAN interface 516 and/or mass data storage 510 of the media player 500. In some implementations, media player 500 includes a display 507 and/or a user input 508 such as a keypad, touchpad and the like. In some implementations, media player 500 may employ a graphical user interface (GUI) that typically employs menus, drop down menus, icons and/or a point-and-click interface via display 507 and/or user input 508. Media player 500 further includes an audio output 509 such as a speaker and/or audio output jack. Signal processing and/or control circuits 504 and/or other circuits (not shown) of media player 500 may process data, perform coding and/or encryption, perform calculations, format data and/or perform any other media player function.

Media player 500 may communicate with mass data storage 510 that stores data such as compressed audio and/or video content in a nonvolatile manner and may utilize jitter measurement. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". Media player 500 may be connected to memory 514 such as RAM, ROM, low latency nonvolatile memory such as flash memory and/or other suitable electronic data storage. Media player 500 also may support connections with a WLAN via a WLAN network interface 516. Communication via the WLAN network interface 516 may be used to support real-time updates, downloading content, streaming of media content, etc. When used portably, the media player 500 may roam through a number of coverage areas and may advantageously use the roaming technique described above.

Figure 4F:
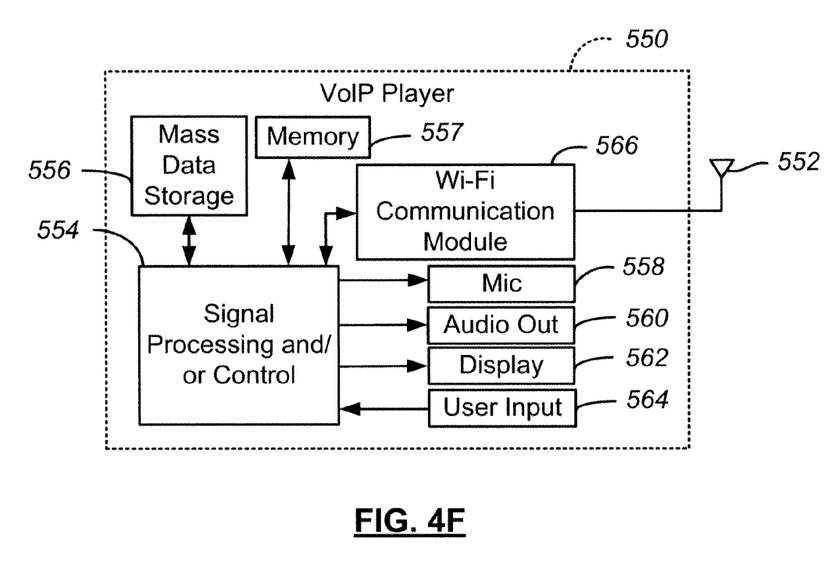

Referring to FIG. 4F, such techniques may be utilized in a Voice over Internet Protocol (VoIP) phone 550 that may include an antenna 552. The VoIP phone 550 may include either or both signal processing and/or control circuits, which are generally identified in FIG. 4F at 554, a wireless interface and/or mass data storage of the VoIP phone 550. In some implementations, VoIP phone 550 includes, in part, a microphone 558, an audio output 560 such as a speaker and/or audio output jack, a display monitor 562, an input device 564 such as a keypad, pointing device, voice actuation and/or other input devices, and a Wireless Fidelity (WiFi) communication module 566, also known as a WLAN interface. Signal processing and/or control circuits 554 and/or other circuits (not shown) in VoIP phone 550 may process data, perform coding and/or encryption, perform calculations, format data and/or perform other VoIP phone functions.

VoIP phone 550 may communicate with mass data storage 556 that stores data in a nonvolatile manner such as optical and/or magnetic storage devices, for example hard disk drives HDD and/or DVDs. The HDD may be a mini HDD that includes one or more platters having a diameter that is smaller than approximately 1.8". VoIP phone 550 may be connected to memory 557, which may be a RAM, ROM, low latency nonvolatile memory such as flash memory and/or other suitable electronic data storage. VoIP phone 550 is configured to establish communications link with a VoIP network (not shown) via Wi-Fi communication module 566. When roaming between access points, the Wi-Fi communication module 566 may advantageously use the roaming techniques described above.

The various blocks, operations, and techniques described above may be implemented in hardware, firmware, software, or any combination of hardware, firmware, and/or software. When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

We claim:

1. A method of managing roaming of a communication device through a wireless local area network with multiple access points, the method comprising:
   in a session with a first access point, communicating data packets between the communication device and the first access point;
   choosing to associate with a second access point;
   sending, to the first access point, a first signal to suspend a connection between the communication device and the first access point;
   responsive to sending the first signal to the first access point, i) suspending the connection between the communication device and the first access point, and ii) storing data packets to be transmitted to the first access point;
   determining if a session between the communication device and the second access point is available;
   if the session between the communication device and the second access point is available, establishing the connection between the communication device and the second access point while the connection between the communication device and the first access point is suspended;
   sending, to the second access point, a second signal to suspend the connection between the communication device and the second access point;
   responsive to sending the second signal to the second access point, suspending the connection between the communication device and the second access point while the connection between the communication device and the first access point is suspended;
   subsequent to establishing and suspending the connection between the communication device and the second access point:
   (i) unsuspending the connection between the communication device and the first access point,
   (ii) communicating, to the first access point, the stored data packets while the connection between the communication device and the first access point was suspended;
   (iii) subsequent to the stored data packets being transmitted to the first access point, concluding the session with the first access point;
   (iv) unsuspending the connection between the communication device and the second access point; and
   (v) in a session with the second access point, communicating data traffic between the communication device and the second access point.

2. The method of claim 1, wherein choosing to associate with the second access point comprises:
   determining that signal quality from the second access point is higher than signal quality from the first access point.

3. The method of claim 1, wherein sending to the first access point, the first signal to suspend the connection between the communication device and the first access point comprises:
   sending, to the first access point, a power management signal indicating the communication device is entering a power saving mode.

4. The method of claim 1, wherein communicating data packets between the communication device and the first access point comprises communicating data packets based on an IEEE 802.11(b) wireless standard.

5. The method of claim 1, wherein suspending the connection between the communication device and the first access point comprises:
   storing pending data packets.

6. The method of claim 5, wherein storing pending data packets comprises:
   storing at least some of the pending data packets at the first access point.

7. The method of claim 5, wherein storing pending data packets comprises:
   storing at least some of the pending data packets at a network controller coupled to the first access point.

8. The method of claim 5, wherein storing data packets comprises:
   storing at least some of the pending data packets at the communication device.

9. The method of claim 1, wherein determining if the session between the communication device and the second access point is available comprises:
   subsequent to suspending the connection between the communication device and the first access point, sending, to the second access point, an other signal for initiating the session.

10. The method of claim 1, further comprising:
    unsuspending the connection between the communication device and the first access point when the session with the second access point is not available.

11. The method of claim 1, wherein communicating data packets between the communication device and the first access point comprises:
    communicating using an Internet Protocol (IP).

12. A computer-readable memory having computer-executable components for use in managing roaming of a communication device in a wireless local area network, the computer-readable memory comprising:
    a first module for determining to roam from a first access point to a second access point;
    a second module for suspending a connection between the communication device and the first access point;
    a third module for establishing a connection between the communication device and the second access point;
    a fourth module, responsive to an acknowledgement signal from the third module that the connection between the communication device and the second access point is established, to direct the third module to temporarily suspend the connection between the communication device and the second access point, to direct the second module to unsuspend the connection between the communication device and the first access point until a packet backlog is cleared between the first access point and the communication device, and subsequent to clearing the packet backlog, to terminate the connection between the communication device and the first access point, after which the fourth module directs the third module to unsuspend the connection between the communication device and the second access point and direct all data traffic to the second access point.

13. The computer-readable memory of claim 12, wherein the fourth module,
responsive to a no-acknowledgement signal from the third module, directs the first module to unsuspend the connection between the communication device and the first access point.

14. A communication device with wireless network access adapted for roaming between wireless access points, the communication device comprising:
a roaming module configured to monitor available access points and determine when a first wireless access point has a lower signal quality than a second wireless access point;
a pseudo power save module configured to manage power save mode activity with each of the first access point and the second wireless access point; and
a connection management module that confirms when a connection between the communication device and the second wireless access point is successful, wherein the connection management module is configured to store packets destined for the first wireless access point (i) from a time when the connection between the communication device and the first wireless access point enters a power save mode and the connection between the communication device and the second wireless access point is established and (ii) until the connection with the first wireless access point is restored from the power save mode and the stored packets can be sent to the first wireless access point.

15. The communication device of claim 14, wherein the roaming module monitors at least one of signal strength and signal-to-noise ratio for all detectable wireless access points.

16. The communication device of claim 14, wherein the pseudo power save module alternates power saving mode settings for the connection between the communication device and the first wireless access point and for the connection between the communication device and the second wireless access point during roaming.

17. The communication device of claim 14, wherein the wireless network access is compatible with an IEEE 802.11 (b) wireless network.

18. A communication device arranged and adapted for roaming between wireless access points, the communication device comprising:
a connection monitor configured to determine when a signal from a current wireless access point is degrading;
an access point search manager configured to determine if another wireless access point can provide a connection with a better signal quality than the current wireless access point;
a connection manager configured (i) to store data packets destined for the current wireless access point during a suspension of a connection between the communication device and the current access point and while a connection between the communication device and another wireless access point is established, and (ii) to send the stored data packets to the current access point after the connection between the communication device and the another wireless access point is established.

19. The communication device of claim 18, wherein the access point manager uses one of signal strength and signal-to-noise ratio for determining if another wireless access point can provide the connection with a better signal quality than the current wireless access point.

* * * * *